Patented Nov. 30, 1948

2,455,259

UNITED STATES PATENT OFFICE 2,455,259

2-METHYL -3- HYDROXY -4- HYDROXY-METHYL PYRIDINE AND ITS ACID SALTS

Gustav J. Martin, Philadelphia, and Souren Avakian, Oreland, Pa., assignors to The National Drug Company, Philadelphia, Pa., a corporation of Pennsylvania No Drawing. Application April 28, 1947,
Serial No. 744,520

3 Claims. (Cl. 260—297)

Our invention relates to new chemotherapeutic agents. More particularly, it concerns the novel compound, 2-methyl - 3 - hydroxy - 4 - hydroxymethyl pyridine, and its salts.

We have found that said compounds are highly effective displacing agents for Vitamin B$_6$ (pyridoxine). Their ability to displace this vitamin makes them highly useful therapeutically, whenever it is desired to reduce the absorption of Vitamin B$_6$ by the body and its effect upon the system. The new agents may be administered in various ways, such as orally and by intramuscular and intravenous injection. They also appear to possess certain pharmacological characteristics that should make them valuable in this department of medicine as well.

The 2 - methyl - 3 - hydroxy-4-hydroxymethyl pyridine may be employed in its free form or in the form of its salts, particularly the hydrochloride. The salts may be prepared in the usual manner, by treating the free amine with various acids, such as sulfuric acid, acetic acid, etc. The free amine may in turn be formed from its salts by treatment in the regular way, with dilute, aqueous alkaline solutions.

We have succeeded in preparing the hydrochloride of 2-methyl-3-hydroxy-4-hydroxymethyl pyridine from 2-picoline (2-methyl pyridine) by the following series of steps:

The 2-picoline was first sulfonated and then fused with caustic alkali according to the methods described in the U. S. Patents Nos. 1,880,645 and 1,880,646, in order to produce the 2-methyl-3-hydroxy pyridine. This product was then converted to the 2-methyl-3-hydroxy-4-diethyl-aminomethyl pyridine according to the method disclosed by Brown and Miller in Journal of Organic Chemistry, vol. 11, Part 4, page 388 (1946).

A solution of 23 grams of the foregoing intermediate in 31 grams of acetic anhydride was heated at 90–95° C. for three hours and then refluxed for one hour. The resulting reaction mixture was dissolved in water, neutralized and extracted with ether. Distillation of the ether extract yielded 23 grams of 2-methyl-3-acetoxy-4-acetoxymethyl pyridine boiling at 135–136° C. under a partial vacuum of 0.3 mm. mercury column. The hydrochloride of this intermediate melts at 161–162° C.

In the final step 5 grams of the 2-methyl-3-acetoxy-4-acetoxymethyl pyridine was dissolved in 200 cc. of 2 N. hydrochloric acid, and the solution was refluxed for 12 hours. The solvent was evaporated under reduced pressure, and the residue recrystallized from ethyl alcohol. The 2-methyl-3-hydroxy-4-hydroxymethyl pyridine hydrochloride so obtained possesses a melting point of 165–166° C. The hydrochloride may be converted to the free amine, if desired, by treatment with a dilute, aqueous solution of sodium hydroxide.

It is apparent that our novel displacing agents may be prepared by methods other than the one just disclosed. Our invention is not limited to the foregoing details. It includes the 2-methyl-3-hydroxy-4-hydroxymethyl pyridine and its salts, as well as all obvious equivalents thereof, no matter how they may have been prepared.

We claim:

1. A compound of the group consisting of 2-methyl-3-hydroxy-4-hydroxymethyl pyridine and its acid salts.

2. 2-methyl-3-hydroxy-4-hydroxymethyl pyridine.

3. The hydrochloride of the compound claimed in claim 2.

GUSTAV JULIUS MARTIN.
SOUREN AVAKIAN.

No references cited.